(12) United States Patent
Ozaki

(10) Patent No.: US 6,466,848 B2
(45) Date of Patent: Oct. 15, 2002

(54) MOTOR VEHICLE STEERING ANGLE DETECTOR AND POWER STEERING SYSTEM EMPLOYING THE SAME

(75) Inventor: Tetsuya Ozaki, Kashiwara (JP)

(73) Assignee: Koyo Seiko Co., Ltd., Osaka (JP)

(*) Notice: Subject to any disclaimer, the term of this patent is extended or adjusted under 35 U.S.C. 154(b) by 0 days.

(21) Appl. No.: 09/985,062

(22) Filed: Nov. 1, 2001

(65) Prior Publication Data

US 2002/0065593 A1 May 30, 2002

(30) Foreign Application Priority Data

Nov. 27, 2000 (JP) ........................................ 2000-359717

(51) Int. Cl.$^7$ .............................................. B62D 12/00
(52) U.S. Cl. ......................... 701/41; 701/42; 180/440; 180/442
(58) Field of Search ............................... 701/41, 42, 43; 180/442, 443, 446, 417, 421, 422, 79.1, 140–143

(56) References Cited

U.S. PATENT DOCUMENTS 6,092,012 A * 7/2000 Shimizu ...................... 701/41
6,244,372 B1 * 6/2001 Sakamaki et al. .......... 180/422

* cited by examiner

Primary Examiner—William A. Cuchlinski, Jr.
Assistant Examiner—Marthe Marc-Coleman
(74) Attorney, Agent, or Firm—Rabin & Berdo, P.C.

(57) ABSTRACT

A detector for detecting the steering angle of a steering mechanism of a motor vehicle includes: a steering angle detecting section that receives data from a steering angle sensor and detects a relative steering angle indicative of a direction and degree of a steering operation; a steering angle midpoint computing section that repeatedly performs a computation when the motor vehicle is traveling to determine a steering angle midpoint value; an absolute steering angle calculating section that calculates an absolute steering angle on the basis of the steering angle midpoint value and the relative steering angle; and a rewritable nonvolatile memory for storing the latest steering angle midpoint value. Immediately after turn-on of the ignition key, before the steering angle midpoint is newly determined, the steering angle midpoint value stored in the nonvolatile memory is used as a tentative steering angle midpoint value for the calculation of the absolute steering angle.

16 Claims, 5 Drawing Sheets

MOTOR VEHICLE STEERING ANGLE DETECTOR AND POWER STEERING SYSTEM EMPLOYING THE SAME

BACKGROUND OF THE INVENTION

1. Field of the Invention

The present invention relates to a motor vehicle steering angle detector for detecting the steering angle of a steering mechanism of a motor vehicle. The invention further relates to a power steering system employing such a steering angle detector, more particularly, to a power steering system which applies a steering assist force to a steering mechanism by a hydraulic pressure generated by a pump driven by an electric motor.

2. Description of Related Art

Power steering systems are conventionally utilized which assist the operation of a steering wheel by supplying a working oil from an oil pump into a power cylinder coupled to a steering mechanism. The oil pump is driven by an electric motor, and a steering assist force is generated by the power cylinder in accordance with the rotation speed of the electric motor.

When the steering is not turned, no steering assist force is required. Therefore, a so-called "stop-and-go control" is performed, wherein the electric motor is deactuated when the steering assumes a straight travel steering state virtually at a steering angle midpoint and, in response to detection of a steering angle change greater than a predetermined level, the electric motor is actuated.

Detection of the steering angle midpoint is based, for example, on an output of a steering angle sensor provided in association of the steering mechanism. The steering angle sensor is adapted to detect a steering angle change with respect to an initial steering angle, i.e., a relative steering angle. The initial steering angle is a steering angle observed when an ignition key switch is turned on. Accordingly, the initial steering angle does not always coincide with the steering angle midpoint, but often corresponds to a steering angle observed when the steering wheel is turned. Therefore, steering angle data for the steering angle midpoint is determined, for example, by sequentially sampling steering angle data for determination of frequency of occurrence of steering angle data, and employing the most frequent steering angle data as the steering angle midpoint data.

The sampling of the steering angle data (relative steering angle data) for the determination of the steering angle midpoint is carried out, for example, on condition that a steering angular speed is virtually zero or the steering wheel is held still (with no steering operation) for at least a predetermined period.

However, the detection of the steering angle midpoint requires a relatively long period of time after the turn-on of the ignition key switch. During this period, a control operation for deactuation of the electric motor cannot be performed, making the energy saving of the power steering system difficult.

SUMMARY OF THE INVENTION

It is an object of the present invention to provide a motor vehicle steering angle detector which is capable of detecting a steering angle immediately after an ignition key is turned on, thereby contributing, for example, to improvement of energy saving of a power steering system.

It is another object of the present invention to provide a power steering system which is capable of starting a control operation for bringing an electric motor into an energy saving mode at a relatively early time point after an ignition key is turned on for improvement of energy saving thereof.

In accordance with the present invention, there is provided a steering angle detector for a motor vehicle, which comprises: a steering angle detecting section which receives an initial value applied thereto when an ignition key of the motor vehicle is turned on, and detects a relative steering angle indicative of a direction and degree of a steering operation; a steering angle midpoint computing section which repeatedly performs a computation during traveling of the motor vehicle to determine a steering angle midpoint value which corresponds to an output value of the steering angle detecting section indicative of a steering angle midpoint; an absolute steering angle calculating section which calculates an absolute steering angle on the basis of the steering angle midpoint value determined by the steering angle midpoint computing section and the relative steering angle detected by the steering angle detecting section; a rewritable nonvolatile memory for storing therein a latest steering angle midpoint value determined by the steering angle midpoint computing section; and a section for setting the steering angle midpoint value stored in the nonvolatile memory as a tentative steering angle midpoint value for the calculation of the absolute steering angle before the steering angle midpoint is newly determined by the steering angle midpoint computing section immediately after the turn-on of the ignition key. The detector preferably further comprises a validity judging section for judging validity of the tentative steering angle midpoint value.

According to the present invention, the steering angle midpoint value determined by the steering angle midpoint computing section is stored in the rewritable nonvolatile memory, and retained therein even after the ignition key is turned off. Since the steering angle midpoint value determined in the previous traveling of the motor vehicle is retained in the nonvolatile memory, the absolute steering angle calculating section performs the absolute steering angle calculation process by employing the steering angle midpoint value as the tentative steering angle midpoint value immediately after the ignition key is next turned on.

When a steering operation is performed during an off-period of the ignition key, however, a relationship between an actual steering angle of a steering mechanism and the steering angle midpoint value stored in the nonvolatile memory is changed from that observed immediately before the turn-off of the ignition key. This means that the tentative steering angle midpoint value read out of the nonvolatile memory is not always valid. Therefore, it is preferred to provide the validity judging section for judging the validity of the tentative steering angle midpoint value.

The steering angle midpoint computing section determines the steering angle midpoint value by sampling outputs of the steering angle detecting section each indicative of a relative steering angle, counting the outputs to determine the frequency of occurrence of outputs for each output value for preparation of a histogram, and defining the most frequent output value as the steering angle midpoint value. The judgment of the validity of the tentative steering angle midpoint value is more easily achieved than the determination of the steering angle midpoint value. Therefore, the process to be performed on condition that a valid steering angle midpoint value is determined or on condition that a correct absolute steering angle is determined can be started at a relatively early time point after the turn-on of the ignition key of the motor vehicle.

The validity judging section may be adapted to judge that the tentative steering angle midpoint value is valid if the motor vehicle travels a distance not smaller than a first predetermined distance with the absolute steering angle being kept within a predetermined steering angle range including the tentative steering angle midpoint value. In this case, the validity judging section maybe adapted to judge that the tentative steering angle midpoint value is invalid unless the tentative steering angle midpoint value is judged to be valid before a traveling distance of the motor vehicle after the turn-on of the ignition key reaches a second predetermined distance greater than the first predetermined distance.

With this arrangement, the tentative steering angle midpoint value is judged to be valid if the motor vehicle travels a distance not smaller than the first predetermined distance with the absolute steering angle being kept within the predetermined steering angle range including the tentative steering angle midpoint value. That is, if the relationship between the tentative steering angle midpoint value and the actual steering angle of the steering mechanism is not significantly changed from that observed immediately before the previous turn-off of the ignition key, the absolute steering angle calculated by the absolute steering angle calculating section on the basis of the tentative steering angle midpoint value is kept within the predetermined steering angle range including the tentative steering angle midpoint value when the motor vehicle travels straight. If the steering operation is performed during the ignition key off-period, the relationship between the tentative steering angle midpoint value and the actual steering angle of the steering mechanism is significantly changed. Accordingly, the absolute steering angle calculated by the absolute steering angle calculating section is not kept within the predetermined steering angle range including the tentative steering angle midpoint value even if the motor vehicle travels straight. Therefore, the tentative steering angle midpoint value is judged to be invalid unless the tentative steering angle midpoint value is judged to be valid before the traveling distance of the motor vehicle after the turn-on of the ignition key reaches the relatively great second predetermined distance.

Further, if the steering angle midpoint value is newly determined by the steering angle midpoint computing section after the turn-on of the ignition key, the steering angle midpoint value thus determined is preferably employed instead of the tentative steering angle midpoint value.

With this arrangement, upon the determination of the steering angle midpoint value by the steering angle midpoint computing section, the steering angle midpoint value thus determined is employed instead of the tentative steering angle midpoint value, and stored in the nonvolatile memory. This thereafter makes it possible to correctly determine the absolute steering angle.

The detector preferably further comprises a rewritable nonvolatile relative-steering-angle memory for storing therein a relative steering angle value detected by the steering angle detecting section immediately before the turn-off of the ignition key, and an initial relative steering angle setting section for setting the relative steering angle value stored in the rewritable nonvolatile relative-steering-angle memory as an initial output value of the steering angle detecting section after the turn-on of the ignition key.

With this arrangement, when the ignition key is turned on, the relative steering angle value detected at the previous turn-off of the ignition key is set as the initial output value of the steering angle detecting section. Therefore, a relationship between the output value of the steering angle detecting section and the tentative steering angle midpoint value observed immediately before the turn-off of the ignition key can be maintained. Thus, the absolute steering angle can correctly be calculated immediately after the turn-on of the ignition key, as long as the tentative steering angle midpoint is valid.

The storage of the relative steering angle in the rewritable nonvolatile relative-steering-angle memory immediately before the turn-off of the ignition key is achieved, for example, by storing an output of the steering angle detecting section in the rewritable nonvolatile relative-steering-angle memory when the speed of the motor vehicle detected by a vehicle speed sensor is zero.

The rewritable nonvolatile relative-steering-angle memory and the nonvolatile steering-angle-midpoint memory may be provided in different storage areas in the same storage device.

In accordance with the present invention, there is further provided an electric power steering system for generating a steering assist force to be applied to a steering mechanism by utilizing a hydraulic pressure generated by a pump driven by an electric motor, the electric power steering system comprising: a motor vehicle steering angle detector having the aforesaid features; and an energy saving mode transition controlling sections for bringing the electric motor into an energy saving mode essentially on condition that an absolute steering angle detected by the motor vehicle steering angle detector is kept within a predetermined steering angle range including a steering angle midpoint value for a predetermined time period.

According to the present invention, the essential condition for bringing the electric motor into the energy saving mode is that the steering angle of the steering mechanism is kept within the predetermined steering angle range including the steering angle midpoint value for the predetermined time period. When the steering angle midpoint value is not sure immediately after the turn-on of the ignition key, therefore, the control operation for bringing the electric motor into the energy saving mode can speedily be started by employing a tentative steering angle midpoint value. This improves the energy saving of the power steering system.

The term "energy saving mode" herein means a mode in which the electric motor is operated with a lower power consumption, for example, a mode in which the electric motor is deactuated or a mode in which the electric motor is driven at an idling rotation speed which is lower than a minimum rotation speed (stand-by rotation speed) thereof employed for a steering assist operation.

The foregoing and other objects, features and effects of the present invention will become more apparent from the following description of the preferred embodiments with reference to the attached drawings.

DESCRIPTION OF THE PREFERRED EMBODIMENTS

Figure 1:
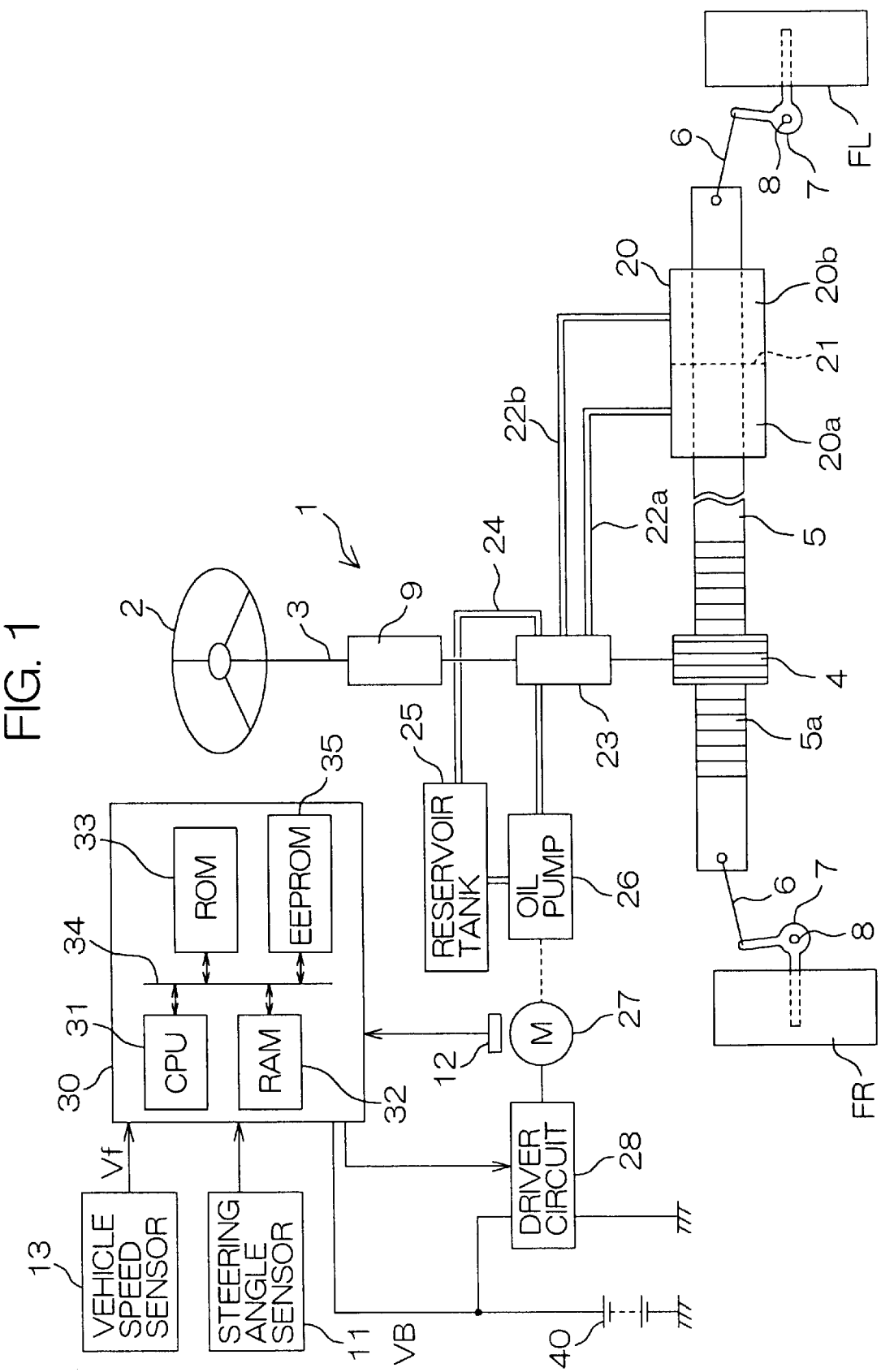
FIG. 1 is a conceptual diagram illustrating the basic construction of a power steering system according to one embodiment of the present invention.

FIG. 1 is a conceptual diagram illustrating the basic construction of a power steering system according to one embodiment of the present invention. The power steering system is provided in association with a steering mechanism 1 of a motor vehicle for applying a steering assist force to the steering mechanism 1.

The steering mechanism 1 includes a steering wheel 2 to be operated by a driver, a steering shaft 3 coupled to the steering wheel 2, a pinion gear 4 provided at a distal end of the steering shaft 3, and a rack shaft 5 having a rack gear 5a meshed with the pinion gear 4 and extending transversely of the motor vehicle. Tie rods 6 are connected to opposite ends of the rack shaft 5, and further connected to knuckle arms 7 which respectively support left and right front wheels FL and FR as steerable vehicle wheels. The knuckle arms 7 are respectively provided rotatably about king pins 8.

With this arrangement, when the steering wheel 2 is operated to rotate the steering shaft 3, the rotational motion is converted into a linear motion transverse to the motor vehicle by the pinion gear 4 and the rack shaft 5. The linear motion is converted into rotational motions oft he knuckle arms 7 about the kingpins 8, thereby turning the left and right front wheels FL, FR.

A torsion bar 9 which is adapted to be twisted in accordance with the direction and magnitude of a steering torque applied to the steering wheel 2 and a hydraulic pressure control valve 23 which is adapted to change its valve aperture in accordance with the direction and magnitude of the torsion of the torsion bar 9 are incorporated in the steering shaft 3. The hydraulic pressure control valve 23 is connected to a power cylinder 20 for applying a steering assist force to the steering mechanism 1. The power cylinder 20 includes a piston 21 provided integrally with the rack shaft 5, and a pair of cylinder chambers 20a and 20b split by the piston 21. The cylinder chambers 20a and 20b are connected to the hydraulic pressure control valve 23 via oil supply/return lines 22a and 22b, respectively.

The hydraulic pressure control valve 23 is disposed in an oil circulation line 24 which extends through a reservoir tank 25 and an oil pump 26. The oil pump 26 is driven by an electric motor 27, so that a working oil contained in the reservoir tank 25 is pumped up and supplied to the hydraulic pressure control valve 23. An excess of the working oil is returned to the reservoir tank 25 from the hydraulic pressure control valve 23 via the oil circulation line 24.

When a torsion is exerted on the torsion bar 9 in one direction, the hydraulic pressure control valve 23 supplies the working oil to one of the cylinder chambers 20a, 20b of the power cylinder 20 via one of the oil supply/return lines 22a, 22b. When a torsion is exerted on the torsion bar 9 in the other direction, the hydraulic pressure control valve supplies the working oil to the other of the cylinder chambers 20a, 20b via the other of the oil supply/return lines 22a, 22b. When virtually no torsion is exerted on the torsion bar 9, the hydraulic pressure control valve 23 is in a so-called equilibrium state, so that the working oil is not supplied to the power cylinder 20 but circulated in the oil circulation line 24.

When the working oil is supplied to either one of the cylinder chambers of the power cylinder 20, the piston 21 moves transversely of the motor vehicle. Thus, a steering assist force acts on the rack shaft 5.

An exemplary construction of the hydraulic pressure control valve 23 is disclosed in detail, for example, in Japanese Unexamined Patent Publication No. 59-118577 (1984).

The electric motor 27 comprises, for example, a DC motor, and is controlled by an electronic control unit 30 via a driver circuit 28. The driver circuit 28 comprises, for example, a power transistor bridge circuit, and is adapted to supply electric power to the electric motor 27 from an on-board battery 40 as a power source in accordance with a control signal applied from the electric control unit 30.

The electronic control unit 30 includes a microprocessor supplied with electric power from the on-board battery 40 for operation. The microprocessor includes a CPU 31, a RAM 32 which provides a work area for the CPU 31, a ROM 33 storing therein control data and operation programs for the CPU 31, an EEPROM (electrically erasable/programmable ROM) 35 for storing therein a steering angle midpoint value and steering angle data (which will be described later), and buses 34 interconnecting the CPU 31, the RAM 32, the ROM 33 and the EEPROM 35.

Steering angle data outputted from a steering angle sensor 11 is applied to the electronic control unit 30. The steering angle sensor 11 is provided in association with the steering wheel 2, and outputs a signal indicative of the direction and degree of the rotation of the steering wheel 2. In the electronic control unit 30, an initial steering angle data value is determined when an ignition key switch is actuated for startup of an engine, and steering angle data (relative steering angle data) corresponding to a relative steering angle with respect to the initial value and having a sign corresponding to the direction of a steering operation is generated on the basis of the detection signal of the steering angle sensor 11. The CPU 31 performs a steering angle midpoint determination process (which will be described later) to determine a steering angle midpoint which corresponds to a steering angle observed when the motor vehicle is in a straight traveling state, on the basis of the steering angle data. Further, the CPU 31 determines an absolute steering angle which corresponds to the direction of the vehicle wheels FR, FL, on the basis of the steering angle midpoint and the steering angle data outputted from the steering angle sensor 11.

The steering angle midpoint determined by the CPU 31 is stored in the EEPROM 35. The determination of the steering angle midpoint is repeatedly performed during an on-period of the ignition key switch and, thereupon, the steering angle midpoint stored in the EEPROM 35 is updated.

The steering angle data indicative of the relative steering angle is stored in the EEPROM 35 in a control cycle (or in a predetermined control cycle) on condition that a vehicle speed Vf detected by a vehicle speed sensor 13 (which will be described later) is not higher than a predetermined level.

Since the information stored in the EEPROM 35 is retained even after the turn-off of the ignition key switch, the steering angle midpoint and the steering angle data can be read out of the EEPROM 35 so as to be used for the calculation of the absolute steering angle immediately after the ignition key switch is next turned on. In this case, the steering angle data read out of the EEPROM 35 is employed as the initial steering angle data value.

Electric current data outputted from an electric current detection circuit 12 for detecting an electric current flowing through the electric motor 27 is also applied to the electric control unit 30. The electric current data has a value directly proportional to an electric current consumed by the electric motor 27 (motor current).

Vehicle speed data outputted from the vehicle speed sensor 13 is also applied to the electronic control unit 30. The vehicle speed sensor 13 may be adapted to directly detect the speed Vf of the motor vehicle or, alternatively, adapted to calculate the speed Vf of the motor vehicle on the basis of output pulses of vehicle wheel speed sensors provided in association with the vehicle wheels.

The electronic control unit 30 controls the electric motor 27 for driving thereof on the basis of the steering angle data, the electric current data and the vehicle speed data.

Figure 2:
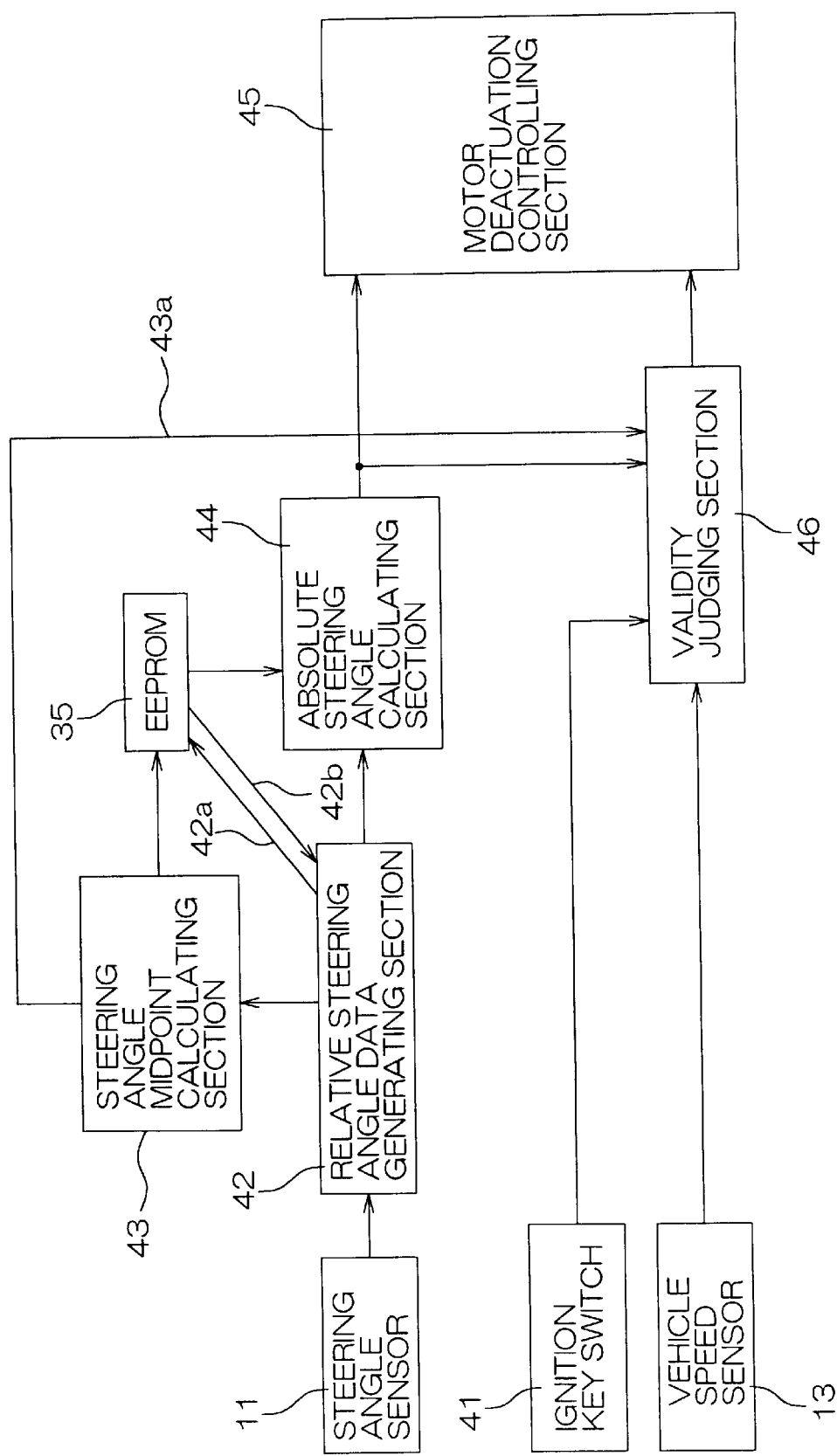
FIG. 2 is a block diagram illustrating a functional construction for determination of an absolute steering angle by an electronic control unit.

FIG. 2 is a block diagram illustrating a functional construction for the determination of the absolute steering angle by the electronic control unit 30. When the steering wheel 2 is operated, the steering angle sensor 11 outputs a signal indicative of the direction and degree of the steering operation. The signal from the steering angle sensor 11 is converted into relative steering angle data in a digital form by a relative steering angle data generating section 42.

The relative steering angle data generating section 42 has, for example, a function as an up-down counter. When the steering angle sensor 11 detects a right turn operation of the steering wheel 2, the relative steering angle data generating section 42 increments a count value in accordance with the degree of the right turn operation and, when the steering angle sensor 11 detects a left turn operation of the steering wheel 2, decrements the count value in accordance with the degree of the left turn operation. The relative steering angle data generated by the relative steering angle data generating section 42 is applied to a steering angle midpoint computing section 43 and to an absolute steering angle computing section 44.

When the vehicle speed Vf becomes zero, the electronic control unit 30 stores the relative steering angle data generated by the relative steering angle data generating section 42 in the EEPROM 35 via a line 42a. Immediately after the ignition key switch 41 is turned on, the electronic control unit 30 applies the relative steering angle data stored in the EEPROM 35 (immediately before the previous turn-off of the ignition key switch) as an initial relative steering angle data value to the relative steering angle data generating section 42 via a line 42b.

The steering angle midpoint computing section 43 determines the frequency of occurrence of relative steering angle data for each data value for preparation of a histogram, and sets the most frequent relative steering angle value as a steering angle midpoint value. The steering angle midpoint value thus set is stored in the EEPROM 35. As long as the ignition key switch 41 is actuated, the steering angle midpoint computing section 43 repeatedly perform the computation for the determination of the steering angle midpoint value. Upon determination of a new steering angle midpoint value, the steering angle midpoint value stored in the EEPROM 35 is updated with the new steering angle midpoint value.

The absolute steering angle computing section 44 calculates the absolute steering angle of the steering wheel 2 on the basis of the steering angle midpoint value stored in the EEPROM 35 and the relative steering angle data applied from the relative steering angle data generating section 42. That is, the absolute steering angle is determined, for example, by subtracting the steering angle midpoint value from the relative steering angle data. The absolute steering angle thus determined is applied, for example, to a motor deactuation controlling section 45 for deactuation control of the electric motor 27.

Immediately after the turn-on of the ignition key switch 41, the steering angle midpoint computing section 43 cannot determine the steering angle midpoint value because the relative steering angle data has not been sampled in an amount sufficient for the determination of the steering angle midpoint. In this embodiment, the absolute steering angle computing section 44 calculates the absolute steering angle by employing the steering angle midpoint value stored in the EEPROM 35 as a tentative steering angle midpoint value immediately after the turn-on of the ignition key switch 41.

However, there is a possibility that the steering wheel 2 is operated during the off-period of the ignition key switch 41. Accordingly, it is impossible to ensure that a relationship between the tentative steering angle midpoint value and an actual steering angle of the steering mechanism 1 is kept unchanged during a period from the previous turn-off of the ignition key switch 41 to the next turn-on of the ignition key switch 41. Therefore, the validity of the tentative steering angle midpoint value is judged by a validity judging section 46.

The validity judging section 46 judges the validity of the tentative steering angle midpoint value (which is equivalent to the validity of the absolute steering angle calculated on the basis of the tentative steering angle midpoint value), and information indicative of the judgment result is applied to the motor deactuation controlling section 45. When the steering angle midpoint is determined by the steering angle midpoint computing section 43 after the turn-on of the ignition key switch 41 and applied to the validity judging section 46 via a line 43a, information indicating that the steering angle midpoint value is valid (or the absolute steering angle outputted from the absolute steering angle computing section 44 is valid) is transferred from the validity judging section 46 to the motor deactuation controlling section 45.

Figure 3:
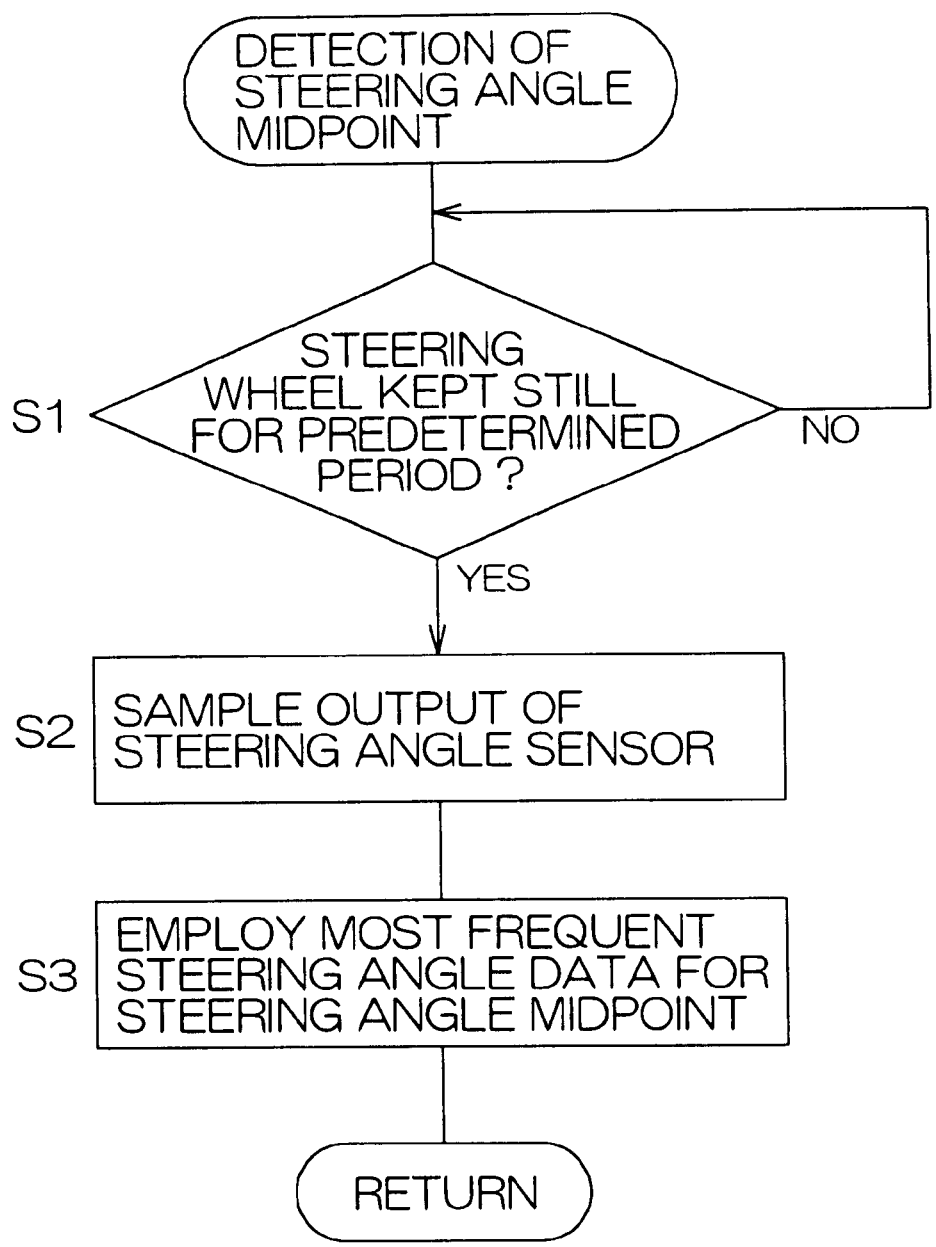
FIG. 3 is a flow chart for explaining a process for determination of a steering angle midpoint.

FIG. 3 is a flow chart for explaining the steering angle midpoint determination process to be performed by the steering angle midpoint computing section. The steering angle midpoint determination process is performed on condition that the motor vehicle is currently in a traveling state. The detection of the traveling state of the motor vehicle is based on a condition such that the speed Vf of the motor vehicle is not lower than a predetermined level (e.g., 5 km/h).

For the determination of the steering angle midpoint, the electronic control unit 30 detects the steering wheel being held still on the basis of a condition such that a steering angular speed determined by differentiating the relative steering angle data with time is lower than a predetermined level (e.g., 8 (degrees/second)). Then, the electronic control unit 30 constantly checks if the steering wheel is held still for a predetermined period (e.g., 1 second) (Step S1).

If the steering wheel is held still for the predetermined period or longer (YES in Step S1), the electronic control unit 30 samples the relative steering angle data outputted from the steering angle sensor 11 for the determination of the steering angle midpoint (Step S2).

On the basis of the sampling result, the electronic control unit 30 counts the steering angle data outputs to determine the frequency of occurrence of outputs for each steering angle data value for preparation of a histogram. Relative steering angle data having the highest frequency of occurrence in the histogram, i.e., the most frequent relative steering angle data, is set as steering angle data for the steering angle midpoint (Step S3). For higher accuracy of the determination of the steering angle midpoint, however, Step S3 is preferably performed only after a predetermined number of steering angle data outputs (e.g., three outputs) are sampled.

Figure 4:
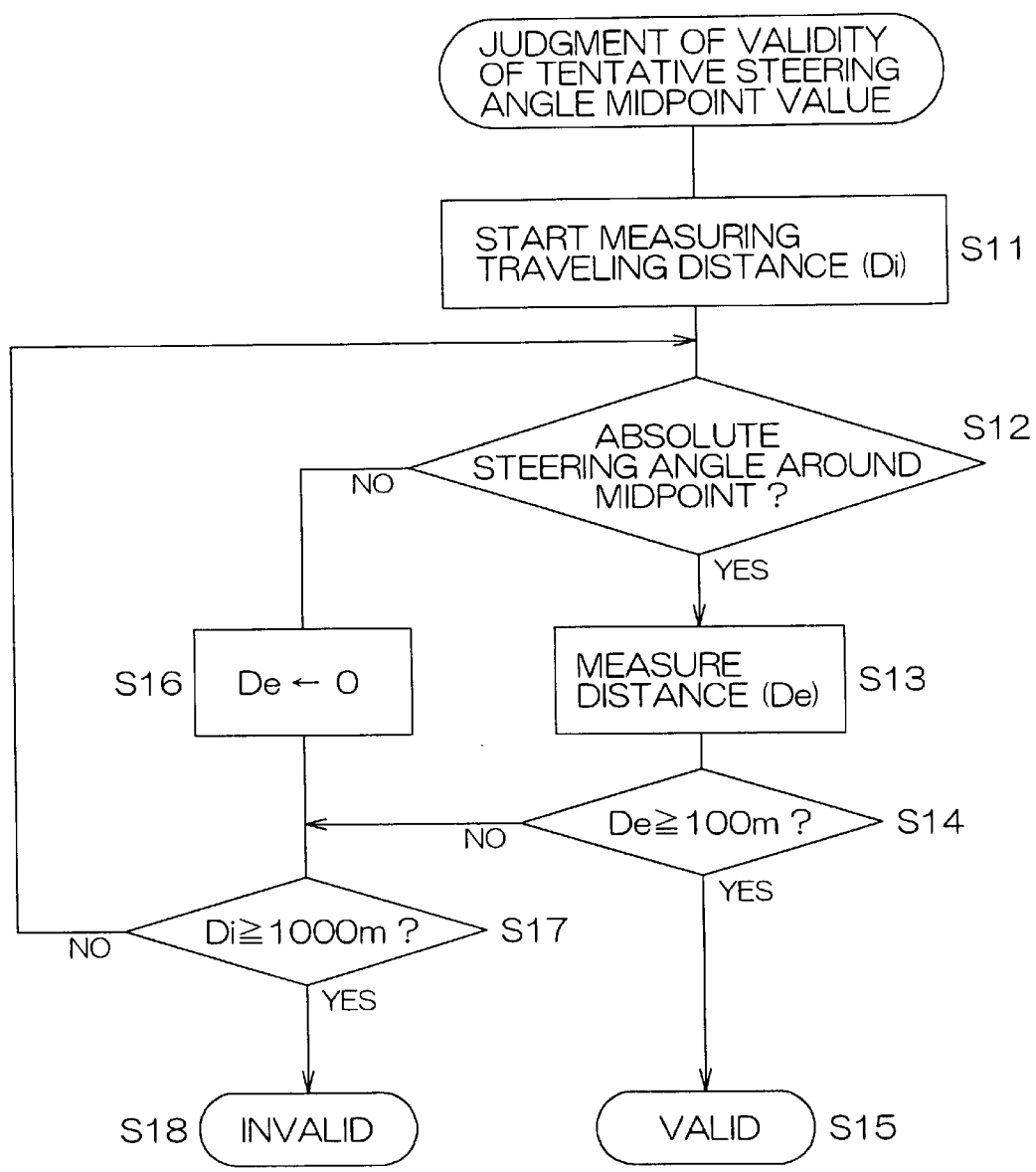
FIG. 4 is a flow chart for explaining a process for judgment of validity of a tentative steering angle midpoint value.

FIG. 4 is a flow chart for explaining the process to be performed by the validity judging section 46 for the judgment of the validity of the tentative steering angle midpoint value. When the ignition key switch 41 is turned on, the validity judging section 46 performs an integration process on outputs of the vehicle speed sensor 13 to start measuring a traveling distance Di of the motor vehicle (Step S11). While continuously performing the traveling distance measuring operation, the validity judging section 46 judges if the absolute steering angle outputted from the absolute steering angle computing section 44 has a value within a predetermined steering angle range (e.g., an angle range about twice the minimum resolution of the steering angle sensor 11) around the steering angle midpoint (Step S12). In this case, the steering angle midpoint value determined immediately before the previous turn-off of the ignition key switch 41 is stored in the EEPROM 35, and the absolute steering angle is determined by employing this steering angle midpoint value as the tentative steering angle midpoint value. The predetermined steering angle range around the steering angle midpoint means a predetermined angle range with the tentative steering angle midpoint value centered therein.

If the absolute steering angle is judged to be within the predetermined steering angle range around the midpoint (YES in Step S12), the validity judging section 46 starts measuring avalidity judgment distance De (Step S13). If the validity judgment distance De reaches, for example, 100 m (first predetermined distance) with the absolute steering angle being kept within the predetermined steering angle range around the steering angle midpoint (YES in Step S14), the tentative steering angle midpoint value is judged to be valid (Step S15). If it is judged in Step S14 that the validity judgment distance De does not reach 100 m, the process goes to Step S17.

If the absolute steering angle is out of the predetermined steering angle range around the steering angle midpoint (NO in Step S12), the validity judgment distance De is reset to zero (Step S16). Then, it is judged if the traveling distance Di continuously measured from the turn-on of the ignition key switch 41 reaches, for example, 1000 m (second predetermined distance) (Step S17). A process sequence from Step S12 is repeatedly performed until the traveling distance Di reaches 1000 m and, if the traveling distance Di reaches 1000 m (YES in Step S17), the tentative steering angle midpoint value is judged to be invalid (Step S18).

Figure 5:
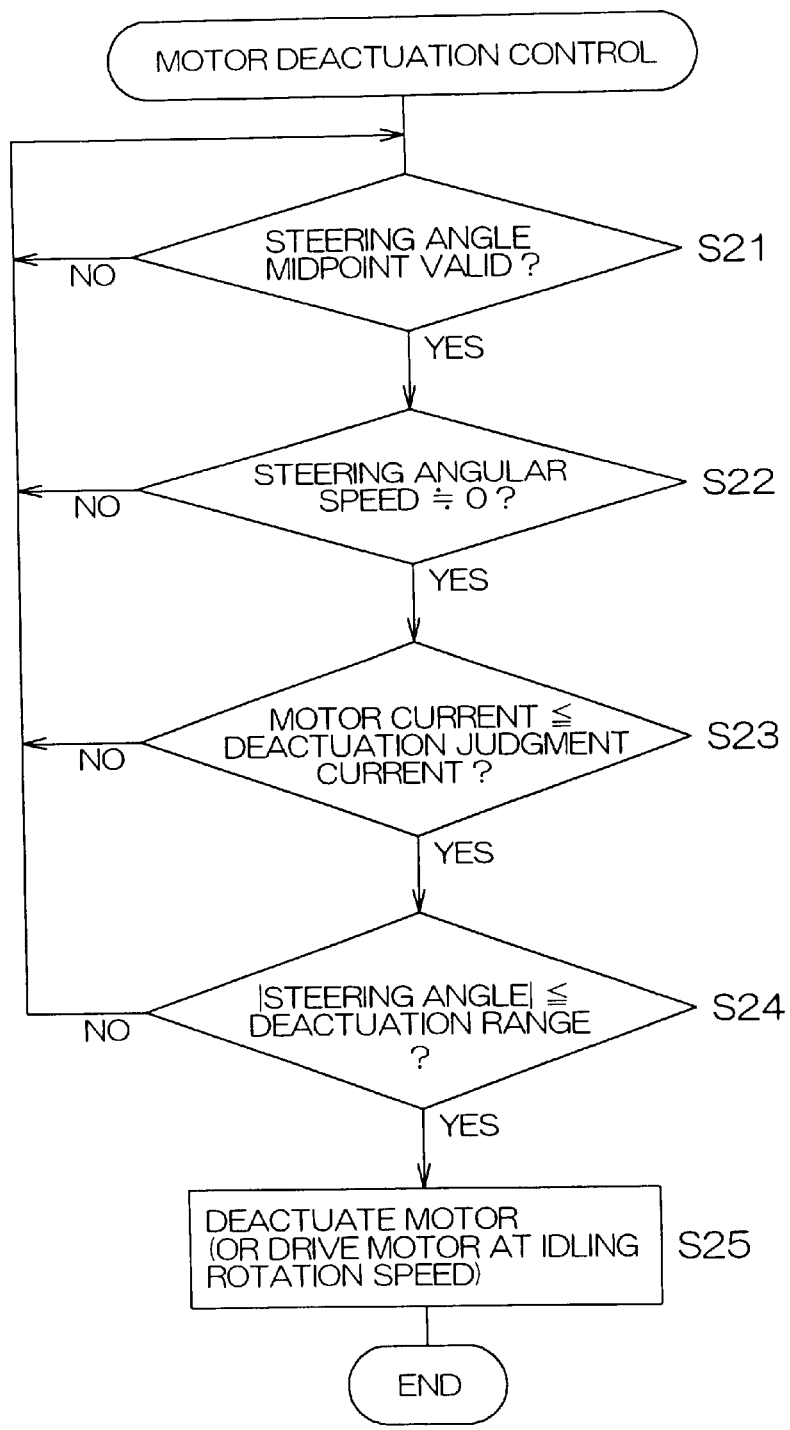
FIG. 5 is a flow chart for explaining a motor deactuation control process.

FIG. 5 is a flow chart for explaining the motor deactuation control process to be performed by the motor deactuation controlling section 45. The motor deactuation controlling section 45 judges if the electric motor 27 is to be deactuated, on the basis of the absolute steering angle applied from the absolute steering angle computing section 44. At this time, the motor deactuation controlling section 45 obtains the information indicative of the validity of the steering angle midpoint (including the tentative steering angle midpoint value) from the validity judging section 46 and, only when the steering angle midpoint is valid, performs the deactuation control of the electric motor 27.

The motor deactuation controlling section 45 first judges if the steering angle midpoint (tentative steering angle midpoint value) is valid (Step S21). If the steering angle midpoint is valid, the motor deactuation controlling section 45 judges if the steering angular speed determined by differentiating the absolute steering angle is zero or close to zero (Step S22). If the steering angular speed is not zero nor close to zero, a process sequence from Step S21 is repeatedly performed.

If the steering angular speed is zero or close to zero, the motor current detected by the electric current detection circuit 12 is referred to. If the motor current exceeds a predetermined deactuation judgment current level (NO in Step S23), the condition for the motor deactuation is not satisfied, so that the process returns to Step S21.

If the condition that the motor current is not higher than the deactuation judgment current level is satisfied (YES in Step S23), it is judged if the absolute steering angle has an absolute value within a deactuation range which is a minute steering angle range with the steering angle midpoint centered therein (Step S24). If the absolute steering angle is out of the deactuation range (NO in Step S24), a process sequence from Step S21 is repeatedly performed. If the absolute steering angle is within the deactuation range (YES in Step S24), power supply to the electric motor 27 is stopped (Step S25). Thereafter, a motor actuation control process is performed to actuate the electric motor 27 again.

Where the steering wheel 2 is kept at a very small steering angle, for example, when the motor vehicle travels along a gentle curve, conditions in Steps S22, S23 and S24 in FIG. 5 may all be satisfied. In this case, the steering assist force is abruptly reduced if the electric motor 27 is deactuated. This abruptly increases the heaviness of the steering operation performed by the driver, deteriorating the steering feeling. One exemplary approach to this problem is to reduce the rotation speed of the electric motor 27 continuously or stepwise for the deactuation of the electric motor 27 rather than suddenly deactuate the electric motor 27 in the motor deactuation process (step S25).

In accordance with this embodiment, as described above, the steering angle midpoint value stored in the EEPROM 35 is tentatively employed for the calculation of the absolute steering angle immediately after the ignition key switch 41 is turned on for startup of the engine. Then, the validity of the tentative steering angle midpoint value is judged through the simple process (Steps S11 to S18 in FIG. 4) and, if the tentative steering angle midpoint value is judged to be valid, the motor deactuation control process is started.

Thus, the motor deactuation control can be started even before the steering angle midpoint is determined by the steering angle midpoint computing section 43. Therefore, the motor deactuation control is started at a relatively early time point after the turn-on of the ignition key switch for improvement of the energy saving of the power steering system.

While one embodiment of the present invention has thus been described, the invention may be embodied in any other ways. In the embodiment described above, the electric motor 27 is deactuated if the steering assist is not necessary but, instead, the electric motor 27 may be controlled so that the rotation speed thereof is reduced to an idling rotation speed which is lower than a minimum rotation speed (stand-by rotation speed) required for the steering assist (see Step S25 in FIG. 5). Thus, the rotation speed of the electric motor 27 can speedily be increased when the steering assist is required for improvement of the responsiveness of the steering assist.

While the present invention has been described in detail by way of the embodiment thereof, it should be understood that the foregoing disclosure is merely illustrative of the technical principles of the present invention but not limitative of the same. The spirit and scope of the present invention are to be limited only by the appended claims.

This application corresponds to Japanese Patent Application No. 2000-359717 filed to the Japanese Patent Office on Nov. 27, 2000, the disclosure thereof being incorporated herein by reference.

What is claimed is:

1. A motor vehicle steering angle detector for detecting a steering angle of a steering mechanism of a motor vehicle, the motor vehicle steering angle detector comprising:

a steering angle detecting section which receives an initial value applied thereto when an ignition key of the motor vehicle is turned on, and detects a relative steering angle indicative of a direction and degree of a steering operation;

a steering angle midpoint computing section which repeatedly performs a computation during traveling of the motor vehicle to determine a steering angle midpoint value which corresponds to an output value of the steering angle detecting section indicative of a steering angle midpoint;

an absolute steering angle calculating section which calculates an absolute steering angle on the basis of the steering angle midpoint value determined by the steering angle midpoint computing section and the relative steering angle detected by the steering angle detecting section;

a rewritable nonvolatile memory for storing therein a latest steering angle midpoint value determined by the steering angle midpoint computing section; and a section for setting the steering angle midpoint value stored in the nonvolatile memory as a tentative steering angle midpoint value for the calculation of the absolute steering angle before the steering angle midpoint is newly determined by the steering angle midpoint computing section immediately after the turn-on of the ignition key.

2. A motor vehicle steering angle detector as set forth in claim 1, further comprising a validity judging section for judging validity of the tentative steering angle midpoint value.

3. A motor vehicle steering angle detector as set forth in claim 2, wherein the validity judging section comprises a section which judges that the tentative steering angle midpoint is valid if the motor vehicle travels a distance not smaller than a first predetermined distance with the absolute steering angle being kept within a predetermined steering angle range including the tentative steering angle midpoint value.

4. A motor vehicle steering angle detector as set forth in claim 3, wherein the validity judging section comprises a section which judges that the tentative steering angle midpoint value is invalid unless the tentative steering angle midpoint value is judged to be valid before a traveling distance of the motor vehicle after the turn-on of the ignition key reaches a second predetermined distance greater than the first predetermined distance.

5. A motor vehicle steering angle detector as set forth in claim 1, wherein if the steering angle midpoint value is newly determined by the steering angle midpoint computing section after the turn-on of the ignition key, the absolute steering angle calculating section employs the steering angle midpoint value newly determined instead of the tentative steering angle midpoint value.

6. A motor vehicle steering angle detector as set forth in claim 1, further comprising:

a rewritable nonvolatile relative-steering-angle memory for storing therein a relative steering angle value detected by the steering angle detecting section immediately before the ignition key is turned off; and an initial relative steering angle setting section for setting the relative steering angle value stored in the rewritable nonvolatile relative-steering-angle memory as an initial output value of the steering angle detecting section when the ignition key is turned on.

7. A motor vehicle steering angle detector as set forth in claim 6, further comprising:

a vehicle speed sensor for detecting a speed of the motor vehicle; and a section for storing an output of the steering angle detecting section in the rewritable nonvolatile relative-steering-angle memory when the speed of the motor vehicle detected by the vehicle speed sensor is zero.

8. A power steering system for generating a steering assist force to be applied to a steering mechanism by utilizing a hydraulic pressure generated by a pump driven by an electric motor, the power steering system comprising:

a steering angle detecting section which receives an initial value applied thereto when an ignition key of the motor vehicle is turned on, and detects a relative steering angle indicative of a direction and degree of a steering operation;

a steering angle midpoint computing section which repeatedly performs a computation during traveling of the motor vehicle to determine a steering angle midpoint value which corresponds to an output value of the steering angle detecting section indicative of a steering angle midpoint;

an absolute steering angle calculating section which calculates an absolute steering angle of the steering mechanism of the motor vehicle on the basis of the steering angle midpoint value determined by the steering angle midpoint computing section and the relative steering angle detected by the steering angle detecting section;

a rewritable nonvolatile memory for storing therein a latest steering angle midpoint value determined by the steering angle midpoint computing section;

a section for setting the steering angle midpoint value stored in the nonvolatile memory as a tentative steering angle midpoint value for the calculation of the absolute steering angle before the steering angle midpoint is newly determined by the steering angle midpoint computing section immediately after the turn-on of the ignition key; and an energy saving mode transition controlling section for bringing the electric motor into an energy saving mode on condition that the absolute steering angle calculated by the absolute steering angle calculating section is kept, for a predetermined time period, within a predetermined steering angle range including the steering angle midpoint value.

9. A power steering system as set forth in claim 8, further comprising a validity judging section for judging validity of the tentative steering angle midpoint value, wherein the energy saving mode transition controlling section brings the electric motor into the energy saving mode on condition that the absolute steering angle calculated by the absolute steering angle calculating section is kept within a predetermined steering angle range including the steering angle midpoint value or a tentative steering angle midpoint value judged to be valid for the predetermined time period.

10. A power steering system as set forth in claim 9, wherein the validity judging section comprises a section which judges that the tentative steering angle midpoint is valid if the motor vehicle travels a distance not smaller than a first predetermined distance with the absolute steering angle being kept within a predetermined steering angle range including the tentative steering angle midpoint value.

11. A power steering system as set forth in claim 10, wherein the validity judging section comprises a section which judges that the tentative steering angle midpoint value is invalid unless the tentative steering angle midpoint value is judged to be valid before a traveling distance of the motor vehicle after the turn-on of the ignition key reaches a second predetermined distance greater than the first predetermined distance.

12. A power steering system as set forth in claim 8, wherein if the steering angle midpoint value is newly determined by the steering angle midpoint computing section after the turn-on of the ignition key, the absolute steering angle calculating section employs the steering angle midpoint value newly determined instead of the tentative steering angle midpoint value.

13. A power steering system as set forth in claim 8, further comprising:

a rewritable nonvolatile relative-steering-angle memory for storing therein a relative steering angle value detected by the steering angle detecting section immediately before the ignition key is turned off; and an initial relative steering angle setting section for setting the relative steering angle stored in the rewritable nonvolatile relative-steering-angle memory as an initial output value of the steering angle detecting section when the ignition key is turned on.

14. A power steering system as set forth in claim 13, further comprising:

a vehicle speed sensor for detecting a speed of the motor vehicle; and a section for storing an output of the steering angle detecting means in the rewritable nonvolatile relative-steering-angle memory when the speed of the motor vehicle detected by the vehicle speed sensor is zero.

15. A power steering system as set forth in claim 8, wherein the energy saving mode includes a mode in which the electric motor is deactuated.

16. A power steering system as set forth in claim 8, wherein the energy saving mode includes a mode in which the electric motor is driven at an idling rotation speed which is lower than a minimum rotation speed thereof employed for a steering assist operation.

\* \* \* \* \*